US007689519B2

(12) United States Patent
Chatte

(10) Patent No.: US 7,689,519 B2
(45) Date of Patent: Mar. 30, 2010

(54) METHOD OF DELIVERING A FRANKING SERVICE VIA A COMMUNICATIONS NETWORK

(75) Inventor: Fabien Chatte, Nogent sur Marne (FR)

(73) Assignee: NEOPOST Technologies, Bagneux (FR)

( * ) Notice: Subject to any disclaimer, the term of this patent is extended or adjusted under 35 U.S.C. 154(b) by 741 days.

(21) Appl. No.: 11/470,830

(22) Filed: Sep. 7, 2006

(65) Prior Publication Data

US 2007/0067249 A1 Mar. 22, 2007

(30) Foreign Application Priority Data

Sep. 9, 2005 (FR) .................................. 05 09182

(51) Int. Cl.
*G06F 17/00* (2006.01)

(52) U.S. Cl. ...................................................... 705/401

(58) Field of Classification Search ....................... None
See application file for complete search history.

(56) References Cited

U.S. PATENT DOCUMENTS 5,602,742 A * 2/1997 Solondz et al. ............. 705/410
6,385,504 B1 5/2002 Pintsov et al.
6,557,758 B1 5/2003 Monico
2004/0128264 A1* 7/2004 Leung et al. ................ 705/402
2005/0278263 A1* 12/2005 Hollander et al. ........... 705/402
2005/0278266 A1* 12/2005 Ogg et al. ................... 705/408

FOREIGN PATENT DOCUMENTS

FR 2 830 650 4/2003
GB 2 387 259 A1 10/2003

OTHER PUBLICATIONS

"Saving Money by Mail", Dempsey, Mary. Crain's Detroit Business. Detroit: Mar. 20, 1995. vol. 11, Iss. 12; Sec. 1. p. 8.*

* cited by examiner

*Primary Examiner*—John W Hayes
*Assistant Examiner*—Rob Wu
(74) *Attorney, Agent, or Firm*—Sughrue Mion, PLLC

(57) ABSTRACT

Method of delivering a franking service including the following operations: connection via a communications network of a user's communications device (10, 12) with a server system (18) operated by a franking services provider, entry via the communications device of a unique identification number carried by a mail item (14) to be sent, selection by the user of a franking service from the various franking services offered by the server system and entry of postal information in relation to the selected service, determination by the server system on the basis of this information of the cost of the selected franking service and communication of this cost to the user, payment by the user for the selected franking service, and depositing of the mail item in a post box (16).

11 Claims, 3 Drawing Sheets

METHOD OF DELIVERING A FRANKING SERVICE VIA A COMMUNICATIONS NETWORK

TECHNICAL FIELD

The present invention relates exclusively to the field of mail processing and more particularly it concerns a method of providing the delivery of a franking service via a telecommunications network.

PRIOR ART

Today, when a private individual or a very small enterprise (VSE) not in possession of a franking machine wishes to frank mail, it is necessary, optionally after weighing, to affix a stamp onto each envelope or package to be sent. An alternative which does not apply to packages can involve the purchase of pre-franked envelopes. However, this limited solution only concerns standard mail without value-added services such as traceable mail, recorded-delivery mail or the registered letter for example, these services most often requiring a visit to the receiving offices of the postal authority for registration.

There is a need, which is currently not being met, for a more universal method of delivering franking services, applicable both to envelopes and packages and which avoids the abovementioned drawbacks, particularly one that can be accessed by anyone 24 hours a day, 365 days a year, and which is particularly simple to put into effect.

DISCLOSURE OF THE INVENTION

The object of the present invention is, therefore, a novel method of delivering a franking service, including the following operations:

- connection via a communications network of a user's portable communications device with a server system operated by a franking services provider,
- entry via the communications device of a unique identification number carried by a mail item to be sent,
- selection by the user of a franking service from the various franking services offered by the server system and entry of postal information in relation to the selected service,
- determination by the server system on the basis of this information of the cost of the selected franking service and communication of this cost to the user,
- payment by the user for the selected franking service, and
- depositing of the mail item in a post box.

Thus, the use of a portable telephone enables any franking service to be obtained and automatically paid for at any time and, therefore, independently of post office opening hours.

Depending on the embodiment envisaged, the operation of connecting to the server system can include either the transmission by a portable communications device of a call to a voice server associated with the server system of the franking services provider or the display by the communications device of a home page of the franking services provider.

Depending on the embodiment envisaged, the operation of entering said unique identification number can include either a manual entry via the keypad of the communications device of a string of alphanumeric characters printed on the mail item and forming this unique identification number, or a digital capture by the communications device of a barcode printed on the mail item, said barcode preferably being a two-dimensional code selected from the following codes: Aztec code, Codablock, Code one, Code 16K, Code 49, data matrix, PDF 417, QR Code, Supercode, or a reading/interrogation by the communications device of an RFID tag carried by the mail item or its contents.

The operation of communicating postal information in relation to the selected service includes at least the communication of the geographical area of the destination of the mail item and the weight class of the mail item.

Depending on the embodiment envisaged, the operation of paying for the franking service selected by the user can include either a credit check of the user's account at the server system of the franking services provider, or a check of the user's telephone credit at a server system of the user's telephone operator, or a secure payment by payment card.

The invention also relates to a communications device intended to put into effect the method of delivering a franking service advantageously comprising one of the following devices: a desktop computer, a portable computer, a mobile or portable telephone, a web-enabled personal digital assistant, a web-enabled portable computer.

The invention also relates to a computer program including code instructions for performing the steps of the method of delivering a franking service when it is executed on the communications device.

BRIEF DESCRIPTION OF THE DRAWINGS

Other characteristics and advantages of the present invention will become more clearly apparent from the following description, provided for information and non limitative of the invention, in reference to the attached drawings, in which.

EMBODIMENT(S) OF THE INVENTION

Figure 1:
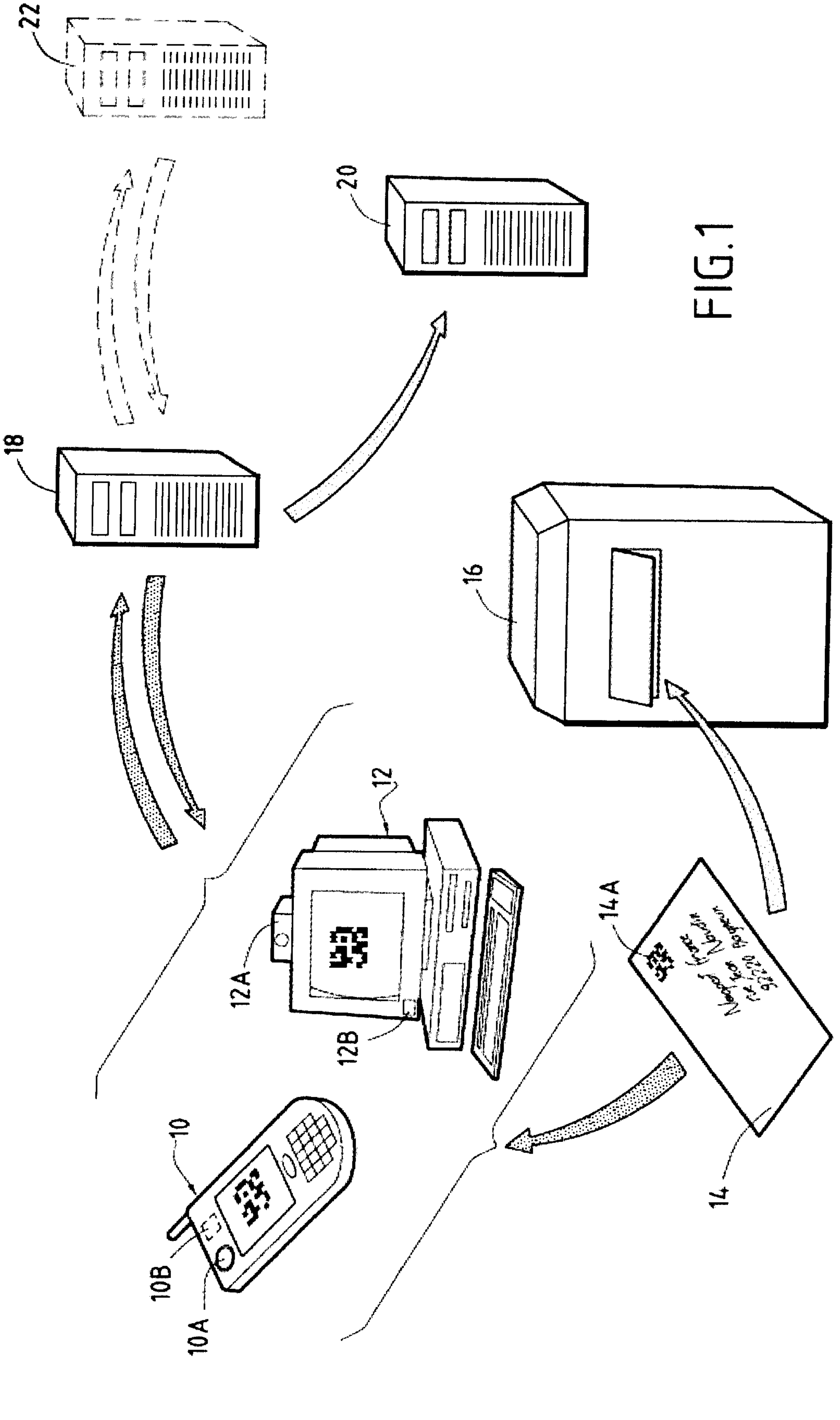
FIG. 1 depicts an example of a network architecture enabling the implementation of the method of delivering a franking service according to the invention.

FIG. 1 illustrates an example of a network architecture necessary to put into effect the method of delivering franking services according to the invention. It is based on the use of a communications device 10, 12, which may or may not be portable and which is used to obtain and pay for a franking service related to a mail item 14 which it is desired to send via any post box 16 of the postal authority. The expression mail item is understood to mean not only an envelope but also a label intended to be affixed to any type of package to be mailed.

To carry out the method of the invention, this mail item is firstly provided with a unique identification number 14A, preferably sequential or of the random non-reusable type, which was printed during the process of creating the mail item, which ensures the printing quality thereof, and the uniqueness of which ensures that two mail items cannot under any circumstances bear the same number. In an alternative embodiment, this identification number can be stored in a contactless chip, or RFID tag, carried by the mail item or its contents. It is important to note that in contrast to a stamp or a postmark of a franking machine, this number does not represent any franking value and therefore does not contain any monetary value.

When it is printed, this unique identification number is advantageously presented in the form of a code with a high capacity for coding digital or alphanumeric data and error correction, such as two-dimensional barcodes of which the best known are: Aztec code, Codablock, Code one, Code 16K, Code 49, data matrix, PDF 417, QR Code, or Supercode. The high coding capacity of this type of code (including up to 4296 characters at the higher end) thus makes it possible for the code to include not only the identification number but also other information relating to the mail item, such as a format reference in the case of an envelope or a manufacturer's number and a country code, such as recommended by the EPC (Electronic Product Code) standard developed by the standardisation organisation of the same name.

In the process of delivering the requested franking service, the communications device is placed in communication with a franking services delivery server system 18 to facilitate the entry of different parameters relating to the requested service, this server being in turn capable of being placed in communication with a postal authority server system 20 intended to receive the different data relating to this service for the purpose of checking the validity thereof, and optionally with a telephone operator server system 22 for the purpose of debiting the cost of the corresponding franking transaction directly from the telephone account which may be held by the user of the service.

The portable communications device 10 is any data processing device enabling long distance wireless communications via a terrestrial or satellite wireless telecommunications network (such as the GSM, UMTS, WiMax networks, etc.) such as a mobile or portable telephone, a web-enabled personal digital assistant or a web-enabled portable computer. In the embodiment envisaged, it can include a digital capture device 10A, such as a digital camera or a two-dimensional barcode reader, or a contactless chip reading/interrogation module 10B designed to cooperate with a transponder (RFID tag) carried by the mail item or its contents when these are therewith provided.

In an alternative embodiment, the communications device 12 is any data processing device enabling communication via a wired communications network (such as the public switched telephone network or ISDN digital networks for example) such as a desktop computer or a portable computer. In the embodiment envisaged, it can include a digital capture device 12A, such as a Webcam or a two-dimensional barcode reader, or a contactless chip reading/interrogation module 12B designed to cooperate with a transponder (RFID tag) carried by the mail item or its contents when these are therewith provided.

The server system 18 located at a site of the franking service provider includes one or more central processing units comprising one or more databases and the control and management thereof are accomplished in the conventional manner by one or more computer terminals (not shown). The server system 20 of the postal authority includes a similar structure with one or more databases, in particular a database of the identification numbers. Similarly, the server system 22 of the telephone operator includes a similar structure with one or more databases, in particular a customer database containing accounting data.

FIGS. 2A to 2H show examples of screen pages displayed successively on the communications device 10, 12 and illustrating the different steps of the method enabling the delivery of a franking service requested by a user.

Figure 2A:
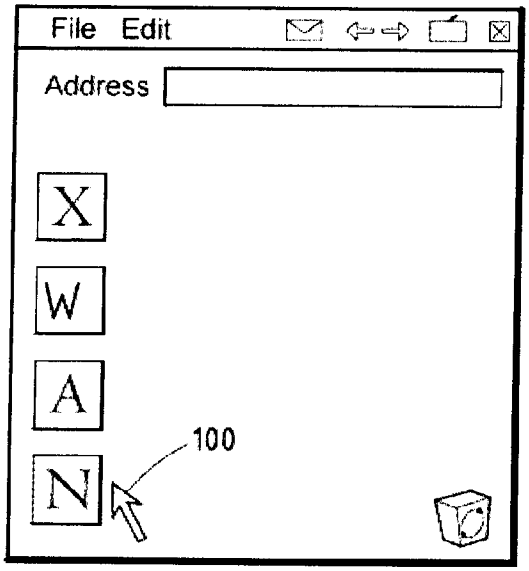
FIGS. 2A to 2H are examples of pages displayed on a display screen of a communications device constituting an essential element of the network architecture in FIG. 1.
Figure 2B:
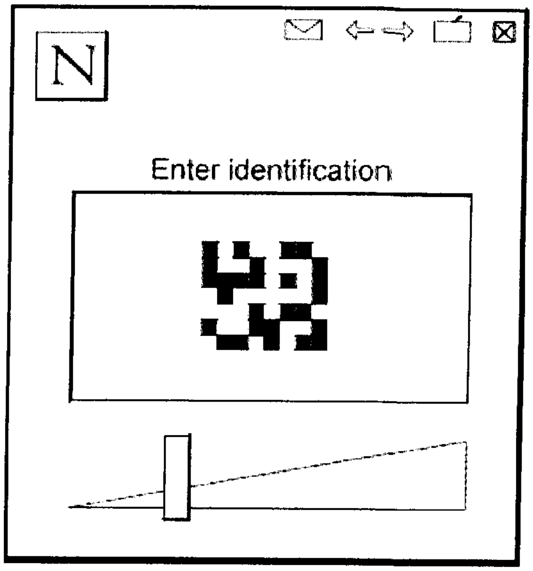
Figure 2C:
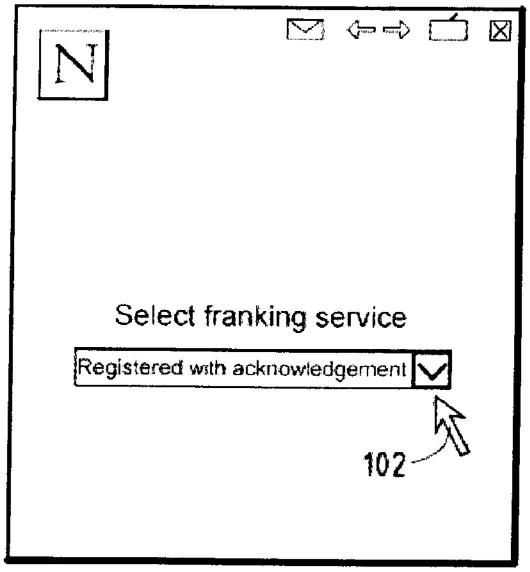
Figure 2D:
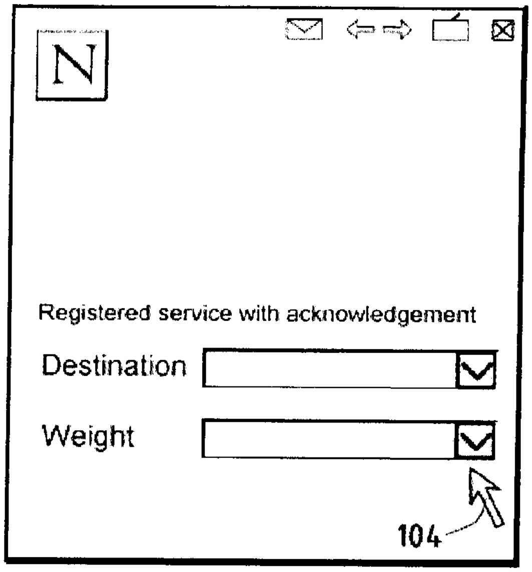

FIG. 2A shows a diagrammatic example of a home page that can be displayed when the communications device is switched on. This page displays the "desktop" of the operating system of the device with its different applications, for example a browser bar, text processor, a spreadsheet, a database, and an application dedicated to the delivery of franking services. The operating system of such a device is known in itself and, depending on the type of device used, can be, for example, Windows®, Linux®, Mac OS®, Windows CE®, embedded Linux®, etc. The same applies to the Web browser of the device which can be, for example, Internet Explorer®, Firefox® or Opera®.

In a first step of putting the method into effect, the user wishing to send a mail item 14 which he/she has previously acquired will click 100 on the franking application icon. This action will place the user in automatic communication with the server system 18 of this service and cause the screen depicted in FIG. 2B to be displayed, which is an entry screen for the unique identification number carried on the mail item to be sent. This screen causes a viewing window to appear corresponding to the digital capture device 10A, 12A and in which the 2D barcode affixed to the mail item will be centred (after optional magnification) and the pressing of a capture button (not shown) will cause the image capture to be accepted and cause the screen in FIG. 3C to be displayed.

It will be noted that when the mail item (or its content) is fitted with an RFID tag, this viewing window will display the identification number retrieved automatically from this tag by the reading/interrogation module 10B, 12B.

The next step of the method then consists in selecting, by a simple click 102, the desired franking service among the different services proposed by the application, for example: standard mail, express mail, traceable mail, registered mail with or without acknowledgement, etc., then entering (action 104 depicted in FIG. 2D) different parameters required for the requested franking service, such as determination of the geographical area of the destination of the mail and the weight class of the item sent (the user having available a weighing module or being in a position to determine the weight of this item).

Figure 2E:
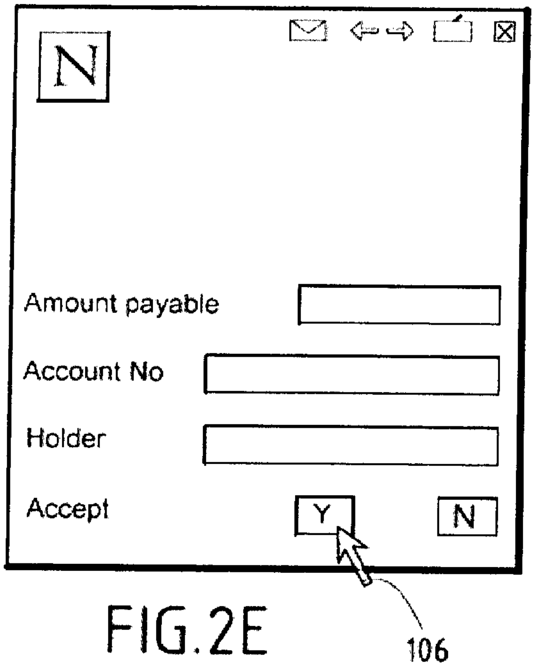
Figure 2F:
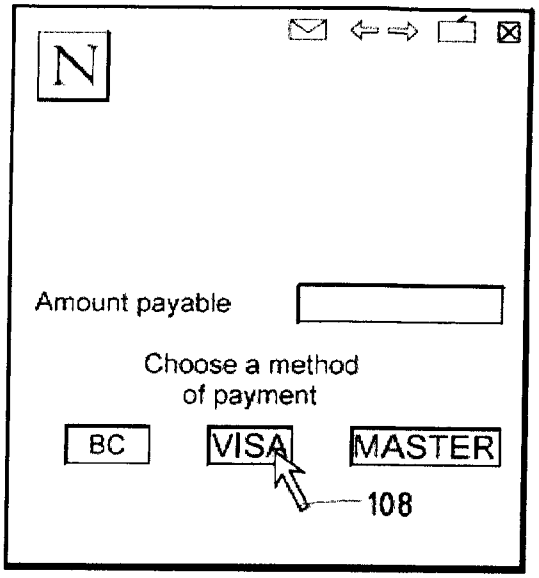

Once the last entry operation is made, the amount payable for the requested franking service will be displayed on one of screens depicted in FIGS. 2E and 2F depending on the method of payment chosen by the user. Thus, if the user has an account with the franking service provider or with a telephone operator in relation with this provider, the indication of the amount payable will be followed by details of the account number and the name of the holder of the account to be debited, and an acceptance action on the user's part (arrow 106) will then complete the transaction. Where a portable communications device is used, verification of the user's access rights before his/her account number is displayed can be accomplished simply by verifying the telephone number of the portable communications device (obtained in a conventional manner based on the IMSI or IMEI numbers of the device originating the call) which will be optionally forwarded to the server system of the telephone operator 20 responsible for checking, by accessing its customer database, whether the user's account has sufficient telephone credit to pay the cost of the requested service.

Figure 2G:
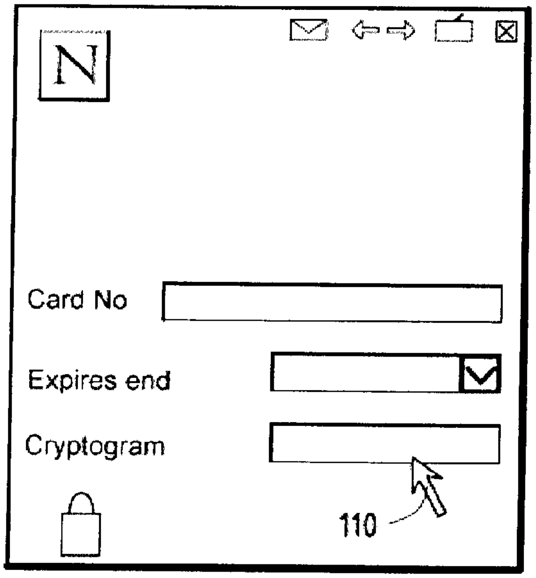
Figure 2H:
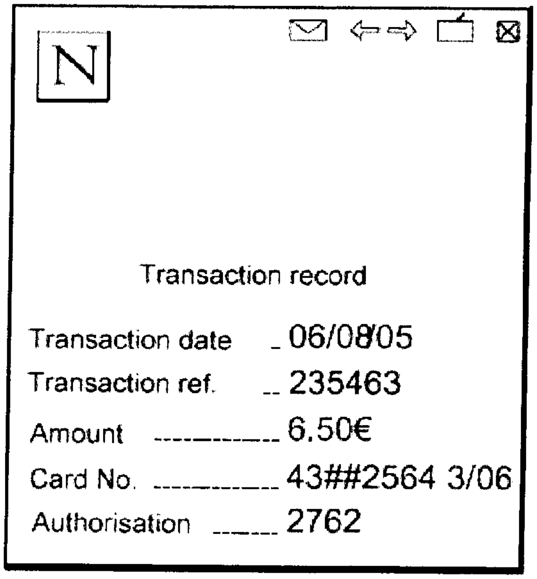

If, on the other hand, the user does not agree to his/her account being debited (by declining the aforementioned acceptance), if his/her credit is insufficient or he/she does not have a telephone account (for example in the case of a prepaid card user), the screen in FIG. 2F will be displayed proposing secure payment by payment card, selection of the card type by an action 108 causing the screen in FIG. 2G to be displayed, in which the user can, in a secure manner, enter his/her bank details (action 110). The screen in FIG. 2H illustrates the transaction report which is then displayed on the screen of the user's communications device and which completes the transaction. It will be noted that the user can interrupt the transaction at any time by closing the application or returning to his/her previous choices.

Thus, with the present invention, any user can in a very simple manner send any mail item, be it an envelope or a package, to any destination without having to visit an office of the postal authority to have the mail franked. The unique identification number (which replaces the stamp or the postmark of a franking machine and plays the role thereof although it has no monetary value) carried on each mail item enables the postal authority, when the mail item is deposited at one of its receiving offices, to process this item by checking the postal data (service requested, destination, weight, etc.) associated with this number in the provider's databases or in its own databases, and to deliver it or otherwise to its recipient depending on whether the payment appropriate to the requested service has been registered.

It will be noted that while the present invention has been described essentially with reference to a mail item provided with an identification number of the 2D-barcode type, it can be envisaged in a more simplified version that this number is a simple alphanumeric code formed by a string of one or several tens of alphanumeric characters machine-readable by means of an OCR reader or simply entered directly by the user via the keypad of his/her communications device after being connected to the provider's server system, this connection possibly taking the form of a call to a voice server associated with the server system which will offer the user all of the choices previously described.

The invention claimed is:

1. A method of delivering a franking service, comprising the following successive operations performed in the stated order:

providing a mail item having a unique identification number carried thereon, connecting via a communications network of a user's communications device (10, 12) with a server system (18) operated by a franking services provider, reading the unique identification number on the mail item and entering, via the communications device, the unique identification number carried by the mail item (14) , selecting, by a user of a franking service, from the various franking services offered by the server system and entry of postal information in relation to the selected service, determining, by the server systems, on the basis of this information of the cost of the selected franking service and communication of this cost to the user, paying by the user for the selected franking service, and depositing of the mail item in a post box (16).

2. Method according to claim 1, wherein the operation of connecting to the server system includes the transmission by a portable communications device (10) of a call to a voice server associated with the server system of the franking services provider.

3. Method according to claim 1, wherein the operation of connecting to the server system includes the display by the communications device of a home page of the franking services provider.

4. Method according to claim 1, wherein the operation of entering said unique identification number includes a manual entry via the keypad of the communications device of a string of alphanumeric characters printed on the mail item and forming this unique identification number.

5. Method according to claim 1, wherein the operation of entering said unique identification number includes a digital capture (10A, 12A) by the communications device of a barcode printed on the mail item.

6. Method according to claim 5, wherein said barcode is a two-dimensional code selected from the following codes: Aztec code, Codablock, Code one, Code 16K, Code 49, data matrix, PDF 417, QR Code, Supercode.

7. Method according to claim 1, wherein the operation of entering said unique identification number includes a reading/interrogation (10B, 12B) by the communications device of an RFID tag affixed to the mail item.

8. Method according to claim 1, wherein the operation of entering postal information in relation to the selected service includes at least the communication of the geographical area of the destination of the mail item and the weight class of the mail item.

9. Method according to claim 1, wherein the operation of paying for the franking service selected by the user includes a credit check of the user's account at the server system of the franking services provider.

10. Method according to claim 1, wherein the operation of paying for the franking service selected by the user includes a check of the user's telephone credit at a server system (22) of the user's telephone operator via the server system of the franking services provider.

11. Method according to claim 1, wherein the operation of paying for the franking service selected by the user includes a secure payment by payment card.

* * * * *